Aug. 22, 1950     E. F. ROSSMAN     2,519,605
SHOCK ABSORBER
Filed Dec. 13, 1947
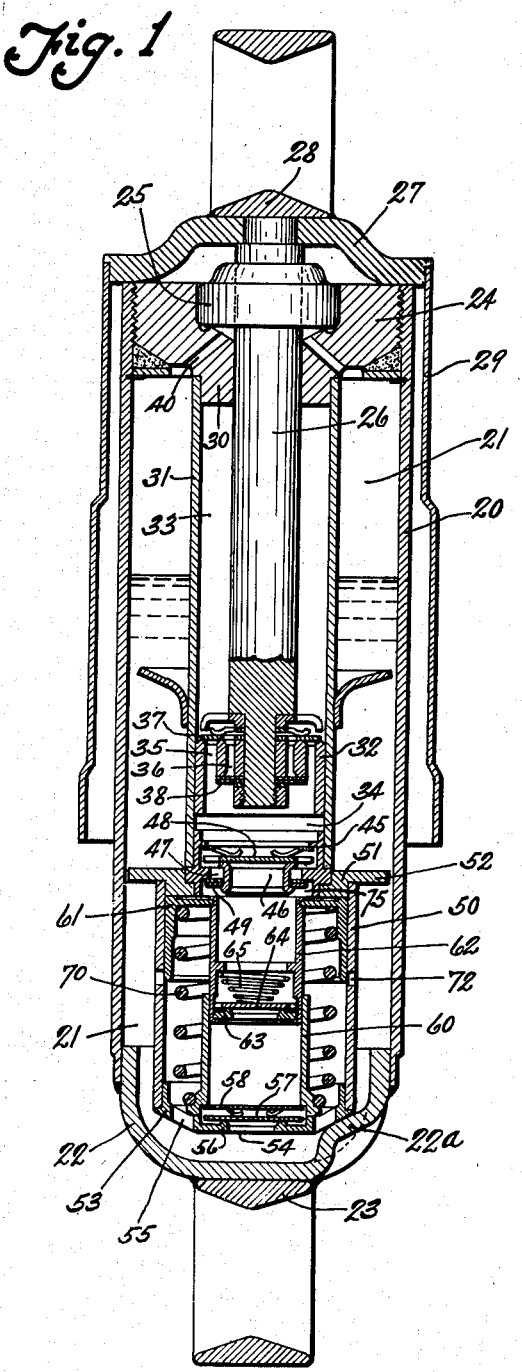
INVENTOR.
EDWIN F. ROSSMAN
BY
HIS Spencer, Hardman and Feher
ATTORNEYS Patented Aug. 22, 1950

2,519,605

UNITED STATES PATENT OFFICE 2,519,605

SHOCK ABSORBER

Edwin F. Rossman, Dayton, Ohio, assignor to General Motors Corporation, Detroit, Mich., a corporation of Delaware Application December 13, 1947, Serial No. 791,565

12 Claims. (Cl. 188—88)

This invention relates to improvements in hydraulic shock absorbers, particularly of the direct acting type.

A hydraulic shock absorber of the direct acting type is one having a cylinder provided with a closure member at each end. A piston in the cylinder has a rod attached thereto which slidably extends through one cylinder closure member. This piston divides the cylinder into two fluid displacement chambers, one of which has the piston rod extending therethrough. The piston has valved passages providing for controlled transfer of fluid from one side of the piston to the other in response to its reciprocation in the cylinder.

A fluid containing reservoir is in communication with the cylinder through a two-way fluid flow control valve mechanism provided in the cylinder closure member opposite the one through which the piston rod passes.

In this type of shock absorber, as the piston moves toward the valved closure member and exerts a pressure upon the fluid between said piston and said closure member, a valve passage in the piston will be opened to permit the displaced fluid to enter into the cylinder chamber containing the piston rod. Due to the presence of the rod in this chamber, all fluid displaced from the opposite cylinder chamber cannot be received so that it may be said that the piston rod displaces that portion of the fluid, ordinarily receivable if the rod were not present in said chamber. Therefore this rod displaced fluid effects the opening of the pressure relief valve portion of the mechanism in the one cylinder closure member to establish a fluid flow from the cylinder into the fluid reservoir.

Upon reversed movement of the piston it exerts pressure upon the fluid in the rod containing cylinder chamber, effecting opening of another valved passage in the piston and providing for the transfer of fluid into the opposite cylinder chamber. The amount of fluid in the smaller capacity, rod containing chamber is insufficient to meet the volumetric requirements of the cylinder chamber into which fluid is being transferred, thus the intake valve portion of the mechanism in the cylinder closure member is operated to permit a flow of fluid from the reservoir into the cylinder chamber sufficient to satisfy its volumetric requirements.

Thus in the ordinary direct acting, hydraulic shock absorber, fluid is transferred directly between the cylinder and fluid reservoir.

It is among the objects of the present invention to provide a direct acting, hydraulic shock absorber with an intermediate fluid reservoir, termed "accumulator" hereinafter, which is interposed between the working cylinder and the main fluid reservoir and into and from which fluid is transferred from and into said working cylinder directly as the piston is reciprocated.

A further object of the present invention is to provide an expansible and contractible accumulator, the fluid in which is constantly under pressure during the operation of the shock absorber.

A still further object of the present invention is to provide a fluid pump between the accumulator and the main fluid reservoir, said pump being rendered automatically effective, in response to expanding and contracting movements of the accumulator, to deliver fluid under pressure from the main fluid reservoir into the accumulator to compensate for any loss of fluid resulting from internal leaks, thereby maintaining the volumetric efficiency of the accumulator and consequently the shock absorber.

Another object of the present invention is to provide means for preventing overfilling of the accumulator during shock absorber operation.

Further objects and advantages of the present invention will be apparent from the following description, reference being had to the accompanying drawings, wherein a preferred embodiment of the present invention is clearly shown.

In the drawings:

Fig. 1 is a longitudinal sectional view of a direct acting hydraulic shock absorber equipped with the present invention. In this view the accumulator is shown completely contracted and unloaded.

Fig. 2 is a fragment of the view shown in Fig. 1, however in this view the accumulator is shown in extreme expanded position.

Referring to the drawings, the numeral 20 designates the outer tube of the shock absorber which forms the fluid reservoir 21. This tubular member 20 has a cup-shaped cover 22 secured at one end in any suitable manner preferably by welding. This end cover or cap has spaced radial ribs 22a used for supporting means as will be described hereinafter. To this end cover cap 22 there is attached, preferably by welding, a ring 23 by means of which this end of the shock absorber is attached to one of the relatively movable members whose movement the shock absorber is intended to control. At the opposite end of tube 20 there are provided interior threads for threadedly receiving the end head or closure member 24. The outer end surface of the head 24 is recessed to receive the packing gland 25. A central opening in the head member 24 axially aligns with an opening in the packing gland 25 and a shaft 26 slidably extends through the opening in the head member 24 and packing gland 25. The end of the rod 26 extending beyond the packing gland 25 has a disc 27 and a ring 28 secured thereto, preferably by welding, the ring 28 being similar to the ring 23 and providing means for attaching this end of the shock absorber to the other relatively movable member whose movement the shock absorber is intended to control. One end of a tube 29 fits over and about the disc 27, being attached thereto to move therewith, this tube 29 surrounding the tube 20 and provides a protective shield about the tube 20.

A reduced diameter portion 30 on the head member 24 is telescopically received in one end of the cylinder 31. The rod 26 extends into this cylinder 31 and has the piston 32 attached thereto which piston divides the cylinder into the upper working chamber 33 and the lower working chamber 34. Piston 32 has through passages 35 and 36, the passages 35 being normally closed by a spring loaded valve 37, while passages 36 are normally closed by spring valve 38. These valved passages 35 and 36 provide for controlled transfer of fluid through the piston in either direction as the piston is reciprocated in the cylinder. As piston 32 is moved upwardly, fluid is transferred from chamber 33 through the piston passage 36 into the chamber 34 and as the piston is moved downwardly in the opposite direction, fluid will be transferred from the chamber 34 through the passages 35 past valve 37 into the working chamber 33 of the cylinder.

The reservoir 21 is in communication with the recess in the head 24, containing the packing gland 25, through passages 40 in the head member 24. Said passages provide for the return of any fluid or air to the reservoir which, during operation of the shock absorber, may leak past the sliding connection between the piston rod 26 and head member 24 into the space in the recesses in head 24 beneath the packing gland 25.

At the end of the cylinder 31 opposite the head member 24 there is provided a compound valve mechanism for controlling the transfer of fluid between the accumulator space 75 and the cylinder chamber 34. This valve mechanism includes a valve cage 45 having a central orifice 46 and surrounding openings 47, the central orifice being normally closed by a spring loaded valve 48 yieldably urged upon the valve cage on the side thereof facing the chamber 34, while openings 47 are normally closed by spring valve 49 urged against the side of the valve cage 45 outside the cylinder 31. Thus, valve 48 may be operated in response to movement of the piston 32 toward the head member 24 to permit fluid to flow from the accumulator space 75 into the cylinder chamber 34, while valve 49 is operated to open its passages 47 in response to movement of the piston 32 toward the valve cage 45 to establish a restricted fluid flow from the cylinder chamber 34 into the accumulator.

As has been stated heretofore, the feature of the present invention is to provide a hydraulic shock absorber of the direct acting type with an expansible and contractible accumulator in communication with the working cylinder of the shock absorber and a pump between said accumulator and the main fluid reservoir continually operative in response to expansion and contraction movements of said accumultor to deliver fluid under pressure from the main reservoir into said accumulator.

This accumulator and pump comprises a cylinder 50 having one end secured to a ring 51 which surrounds and supports the valve cage 45 of the compound valve mechanism. This ring has outwardly extending fingers 52, the outer peripheral edges of which lie adjacent to the inner wall of the tube 20 thereby substantially centralizing the two cylinders 31 and 50 in the tubular shell 20. The other end of the cylinder 50 has an end cover member 53 fitted thereon which rests upon the radial ribs 22a in the cover cap 21. It will be seen that as the head member 24 is screwed into the cover 20, it will exert a pressure upon the cylinder 31 which pressure in turn is exerted through the valve cage 45 and ring 51 upon the cylinder 50 to clamp the end cover 53 thereof into rigid engagement with the radial ribs 22a in the cover 22.

The end cover 53 has a central aperture 54 and an annular row of other apertures 55 surrounding said central aperture. On the inside surface of the cover 53 there is provided an annular ridge 56 surrounding the central aperture 54, this ridge forming a valve seat upon which the intake valve 57 of the pump is yieldably urged by the spring 58. Spring 58 is retained in a recess in the end edge of a tube 60 which rests upon the end cover 53. This tubular member 60 forming the pump cylinder extends coaxially into the cylinder 50 being of comparatively lesser diameter than said cylinder. The movable wall of the accumulator 75 is in the form of a floating piston 61, slidably supported within the cylinder 50, this floating piston having a hollow core 62 secured in a central opening in the head of piston 61, said core, forming the piston of the pump, being telescopically received by and slidable in the tubular member or pump cylinder 60. A valve seat 63 is provided within the hollow core 62 of the floating piston 61 and a valve 64 is yieldably urged upon said valve seat 63 by spring 65. Both valves 57 and 64 operate in the same direction, that is, both may be lifted from their normally engaged seats to permit fluid to flow past said valves in one direction only. A coil spring 70 is interposed between the movable wall of the accumulator or as termed the floating piston 61 and an outwardly extending annular flange on the tubular member or pump cylinder 60, this spring maintaining said pump cylinder 60 upon the end cover 53 of cylinder 50 and yieldably urging the floating piston 61 toward the cylinder 31 normally maintaining said floating piston in engagement with the ring 51 as shown in Fig. 1, in which position the accumulator is completely contracted.

A series of bleeder holes 72 are provided in the wall of the cylinder 50, these bleeder holes normally being closed by the floating piston 61. However, when said piston 61 is moved a predetermined distance from engagement with ring 51 or its normal position, bleeder holes 72 will be uncovered to provide communication between the reservoir 21 and the accumulator space 75 within the cylinder 50 between the floating piston 61 and the compound valve mechanism in the cylinder 31 thereby venting this space. In the Fig. 2, the piston 61 is shown in the position in which the bleeder holes 72 are venting the space 75 in cylinder 50 between the floating piston 61 and the main shock absorber cylinder 31.

The Fig. 1 shows the shock absorber in fully collapsed position. If due to separating movements of the members between which the shock absorber is suspended, the piston is moved toward the head member 24 fluid under pressure in the cylinder chamber 33 will move valve 38 on the piston to permit fluid from the chamber 33 to pass through passages 36 in the piston into the chamber 34 of the cylinder 31. The fluid displaced from the smaller capacity chamber 33, due to the presence of the rod 26 in said chamber, will not be sufficient completely to fill the larger capacity chamber 34, and thus valve 48 of the compound valve mechanism will be lifted to permit fluid to flow into chamber 34 from outside the cylinder 31. If the fluid content in the space 75 is not sufficient to satisfy the requirements of cylinder chamber 34, piston 61 having reached the position shown in Fig. 1, then valves 64 and 57 will be lifted to permit fluid to flow from the reservoir through the pump cylinder 60 to fill the working chamber 34.

Now as soon as the movement of the piston 32 is reversed, due to the approaching movement of the members between which the shock absorber is suspended, then pressure will be exerted upon the fluid within the chamber 34 causing a part of the fluid to flow from said chamber through the piston passages 35 past valve 37 into the cylinder chamber 33 containing the rod 26. Due to the presence of rod 26 in said chamber, all the fluid from chamber 34 cannot enter the chamber 33 and thus the portion of the fluid not receivable by chamber 33 will be delivered through passages 47 past the valve 49 of the compound valve mechanism into the accumulator space 75 between said valve mechanism and the movable wall of the accumulator or floating piston 61. In response to this fluid pressure, floating piston 61 will be moved downwardly in cylinder 50 toward the end cover member 53. As this piston 61 moves downwardly, valve 64 will be opened and fluid within the tubular member or pump cylinder 60 will be caused to flow past valve 64 into the accumulator space 75. On the next stroke of the piston 32 toward the end cover member 24, fluid taken from the accumulator into the chamber 34 of the cylinder 31 in response to said piston movement will permit the actuation of the floating piston 61 under the effect of spring 70, thereby causing fluid to be delivered under pressure through the compound valve mechanism and past its valve 48 into the cylinder working chamber 34.

As the floating piston 61 is moved upwardly by the spring 70, in response to upward movement of piston 32, the pump piston 62 is likewise moved upwardly in its cylinder 60 which is its suction stroke for during this time fluid is taken from the reservoir 21 past the valve 57 into the pump cylinder to fill said cylinder 60. Since the capacity of the pump cylinder 60 is not sufficient to compensate for the displacement of piston rod 26 the downward movement of the shock absorber and consequently the pump will eventually fill the accumulator space 75 to its limit, that is, until the floating piston 61 has by increasing fluid supply in the accumulator space 75 moved to uncover the vent holes 72 as shown in Fig. 2. With these vent holes uncovered, any excessive fluid supplied by the pump to the space 75 will be discharged back to the reservoir. Thus these vent holes provide a safety element to prevent overfilling of the accumulator under any conditions.

From the aforegoing description it may be seen that the accumulator and the pump associated therewith operate in response to reciprocations of the shock absorber piston 32. The accumulator receives fluid from two sources, first, the fluid displaced from the working cylinder and from the pump as the piston 32 moves in one direction and second, fluid under pressure from the pump as the piston 32 moves in the other direction. As the pump continues to keep the accumulator filled sufficient fluid to insure efficient operation at all times is assured.

While the embodiment of the present invention as herein disclosed, constitutes a preferred form, it is to be understood that other forms might be adopted, all coming within the scope of the claims which follow.

What is claimed is as follows:

1. A hydraulic shock absorber comprising in combination, a fluid reservoir; a cylinder; a positively actuated piston in the cylinder; said piston having oppositely acting, valved passages; a valve mechanism in the one end of the cylinder, operative to control fluid flow into and out of said cylinder in response to reciprocation of the piston; an accumulator in communication with the cylinder through said valve mechanism, said accumulator receiving fluid displaced from the cylinder and being operative to return it, under pressure to said cylinder; a pump interposed between the accumulator and fluid reservoir; said pump being operative to deliver fluid from the reservoir into the accumulator; and means operative directly to connect the accumulator with the reservoir, independently of the pump when said accumulator has received a predetermined supply of fluid.

2. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an expansible and contractible accumulator with which said control mechanism communicates; means yieldably acting upon the accumulator to contract it; fluid delivery means interposed between the accumulator and fluid reservoir, operative to deliver fluid, under pressure, from the reservoir into the accumulator; and venting means directly connecting the accumulator with the reservoir when said accumulator contains a predetermined supply of fluid provided by said fluid delivery means.

3. A hydraulic shock absorber comprising in combination, a fluid reservoir; a cylinder; a positively actuated piston in the cylinder, said piston having oppositely acting, valved passages; a valve mechanism in the one end of the cylinder, operative to control fluid flow into and out of said cylinder in response to reciprocation of the piston; an accumulator in communication with the cylinder through said valve mechanism, said accumulator receiving fluid displaced from the cylinder and being operative to return it, under pressure, to said cylinder; a pump, one element of which comprises one member of the accumulator, said pump being operative to deliver fluid from the reservoir into the accumulator; and means operative independently of the pump, for connecting the accumulator with the reservoir when said accumulator is predeterminately filled with fluid.

4. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an expansible and contractible accumulator with which said control mechanism communicates; means yieldably acting upon the accumulator to contract it; means comprising one element of the accumulator, said means being operative in response to accumulator action, for delivering fluid, under pressure, from the reservoir into the accumulator; and means operative directly to connect the accumulator with the reservoir, independently of the pump, when said accumulator is predeterminately expanded.

5. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; and expansible and contractible accumulator with which said control mechanism communicates; means yieldably acting upon the accumulator to contract it; means, one portion of which comprises one member of the accumulator, said means being operative in response to contraction of the accumulator, to draw a supply of fluid from the fluid reservoir and in response to expansion of the accumulator to deliver fluid in said means to the accumulator; and means directly connecting the accumulator with the reservoir in response to predetermined expansion of the accumulator.

6. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an accumulator comprising a cylinder, one end of which is in communication with the two-way control mechanism, said cylinder containing a partition member longitudinally reciprocative therein and normally yieldably urged toward and against the said one end thereof; a pump between the accumulator and fluid reservoir, said pump comprising a cylinder having a valved closure member at its one end and a valved piston formed by an extension on the movable partition member of the accumulator and slidably fitting into the pump cylinder, the valves in said pump cylinder and piston acting in the same direction, one to permit fluid to enter the pump cylinder as the accumulator partition moves to inject fluid into the cylinder, the other to inject fluid from the pump cylinder into the accumulator as the accumulator partition is moved by fluid pressure from the fluid flow control mechanism in the shock absorber cylinder; and means rendered effective upon predetermined movement of the accumulator partition, directly to connect said accumulator with the reservoir independently of the pump.

7. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an expansible and contractible accumulator chamber and a fluid pump interposed between the shock absorber cylinder and the fluid reservoir, the piston of the pump forming the movable wall of the accumulator chamber, said wall being yieldably urged by a spring toward the shock absorber cylinder, the cylinder of the pump in which the movable wall reciprocates, being held stationary by said spring, both pump piston and cylinder having normally closed valves, the cylinder valve providing for a flow of fluid from the reservoir into the pump cylinder when the movable wall of the accumulator is spring actuated, the piston valve being operative to effect fluid from the pump cylinder to be forced into the accumulator when the movable wall thereof is actuated against the effect of the spring; and vents rendered effective by predetermined expansion of the accumulator chamber, directly to connect said chamber with the reservoir.

8. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an expansible and contractible accumulator in communication with the shock absorber cylinder, said accumulator having a movable wall normally yieldably urged to contract the accumulator; a pump cylinder having a normally closed, intake valve in its end in communication with the reservoir; an extension on the movable wall of the accumulator, slidably fitting into the pump cylinder and forming the piston therefor, said extension having a normally closed valve operative to provide for the transfer of fluid from the pump cylinder into the accumulator when the movable wall of said accumulator is actuated by fluid displaced from the shock absorber cylinder; and accumulator venting ports rendered effective directly to connect the accumulator with the reservoir in response to predetermined expansion of said accumulator.

9. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an expansible and contractible accumulator comprising a cylinder in communication with the shock absorber cylinder by having one end secured thereto, the other end being provided with a perforate end member having a central opening and other surrounding openings; a movable partition in the accumulator cylinder; a spring yieldably urging said partition toward the shock absorber cylinder; a fluid replenishing pump interposed between the accumulator and the fluid reservoir, said pump comprising a cylinder within the accumulator cylinder and urged upon the end member thereof by the aforementioned spring; a spring loaded valve in the pump cylinder normally closing the central opening in the end member; a piston in said pump cylinder, attached to the movable partition and having a normally closed valve operative to permit fluid from the pump cylinder to be forced into the accumulator in response to actuation of the partition by fluid displaced from the shock absorber cylinder; and means, rendered effective in response to predetermined expansion of the accumulator, for directly connecting said accumulator with the reservoir.

10. A shock absorber in accordance with claim 9 in which, however, the accumulator cylinder has ports normally covered by the movable end wall therein but adapted to be uncovered and directly connect the interior of the accumulator with the reservoir when the said movable wall is actuated into a predetermined position by fluid displaced from the shock absorber cylinder.

11. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an expansible and contractible accumulator in communication with the shock absorber cylinder; a spring constantly exerting a force upon the accumulator to contract it; a pump, the cylinder of which has a normally closed intake valve in communication with the fluid reservoir, the piston of the pump being connected to and actuated by a movable portion of the accumulator, said piston having a normally closed valve operative in response to expansion of the accumulator, to permit fluid from the pump cylinder to be injected into the accumulator; and means rendered effective by predetermined expansion of the accumulator for connecting said accumulator with the reservoir independently of the pump.

12. A hydraulic shock absorber comprising in combination, a cylinder; a fluid reservoir; a positively actuated piston in the cylinder, said piston having valved passages providing for the transfer of fluid through the piston in either direction; a two-way fluid flow control mechanism in the cylinder; an expansible and contractible accumulator in communication with the shock absorber cylinder and expansible by the fluid displaced from said cylinder; a pump having a cylinder provided with a normally closed intake valve in communication with the fluid reservoir; a spring interposed between the pump cylinder and the accumulator, said spring holding the pump cylinder in position and urging the accumulator into contracted position, said pump cylinder having a valve piston secured to and operative by the accumulator to draw fluid into the pump cylinder when the accumulator is being contracted and to force the fluid from the pump cylinder into the accumulator when said accumulator is expanded; and means operative directly to connect the accumulator with the reservoir in response to predetermined expansion of said accumulator.

EDWIN F. ROSSMAN.

REFERENCES CITED

The following references are of record in the file of this patent:

UNITED STATES PATENTS

| Number | Name | Date |
|---|---|---|
| 2,038,032 | Flynn | Apr. 21, 1936 |
| 2,126,880 | Gardner | Aug. 16, 1938 |
| 2,333,096 | Dowty | Nov. 2, 1943 |
| 2,346,275 | Read et al. | Apr. 11, 1944 |